United States Patent
Vajravel et al.

(10) Patent No.: US 11,586,452 B2
(45) Date of Patent: Feb. 21, 2023

(54) PREDICTING AND CREATING A SESSION ON A USER'S COMPUTING DEVICE

(71) Applicant: Dell Products L.P., Round Rock, TX (US)

(72) Inventors: Gokul Thiruchengode Vajravel, Bangalore (IN); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 284 days.

(21) Appl. No.: 17/164,245

(22) Filed: Feb. 1, 2021

(65) Prior Publication Data
US 2022/0244969 A1 Aug. 4, 2022

(51) Int. Cl.
*G06F 9/44* (2018.01)
*G06F 9/448* (2018.01)
*H04L 67/141* (2022.01)
*G06N 5/04* (2023.01)

(52) U.S. Cl.
CPC ............ *G06F 9/4494* (2018.02); *G06N 5/04* (2013.01); *H04L 67/141* (2013.01)

(58) Field of Classification Search
CPC .................................................. G06F 9/4494
See application file for complete search history.

(56) References Cited

U.S. PATENT DOCUMENTS

| | | | |
|---|---|---|---|
| 2004/0098486 A1* | 5/2004 | Gu | G06F 16/9574 709/228 |
| 2017/0147795 A1* | 5/2017 | Sardesai | G06F 21/41 |
| 2021/0044631 A1* | 2/2021 | Duperre | H04L 67/1014 |
| 2021/0176146 A1* | 6/2021 | Vasseur | G06N 5/04 |

* cited by examiner

*Primary Examiner* — Timothy A Mudrick
(74) *Attorney, Agent, or Firm* — Kirton McConkie; Brian Tucker (57) ABSTRACT

A session can be predicted and created on a user's computing device to thereby allow the user to immediately resume productivity upon logging in. When a user accesses a set of applications from multiple computing devices and/or at different times or locations, telemetry information can be captured and processed to generate session predictions for the user. The session predictions can then be employed to automatically create sessions on the user's computing devices based on the user's location and the time of day.

20 Claims, 12 Drawing Sheets

| ID | Location | Predicted Session Start Time | Applications | Peripherals |
|---|---|---|---|---|
| PhoneID | Home | 7:00 AM | VDI App 232a-2 (on top)<br>Cloud App 233a-1 | None |
| LaptopID | Home | 8:00 AM | Local App 231-1 (position x, y)<br>VDI App 232a-1 (position x, y)<br>Cloud App 233a-1 (position x, y) | Dock, Monitor ... |
| LaptopID | Work | 9:00 AM | Local App 231-1 (position x, y)<br>Local App 231-2 (position x, y)<br>Cloud App 233a-1 (position x, y) | Dock, Monitor ... |
| LaptopID | Home | 7:00 PM | Local App 231-1 (position x, y)<br>VDI App 232a-1 (position x, y) | None |

← User-specific Session Predictions

PREDICTING AND CREATING A SESSION ON A USER'S COMPUTING DEVICE

CROSS-REFERENCE TO RELATED APPLICATIONS

N/A

BACKGROUND

It is becoming common for businesses to allow their employees to use a variety of computing devices to access applications for work purposes. Also, techniques, such as Dell's Hybrid Client, have been developed to allow these applications to be hosted in different ways while remaining seamlessly accessible from the variety of computing devices that an employee may use. For example, these applications may include native (i.e., locally installed) applications, applications accessible via a virtual desktop infrastructure (e.g., applications hosted on-premises or in a private cloud), applications streamed from a public cloud (e.g., Office 365 hosted in Azure), etc.

Figure 1:
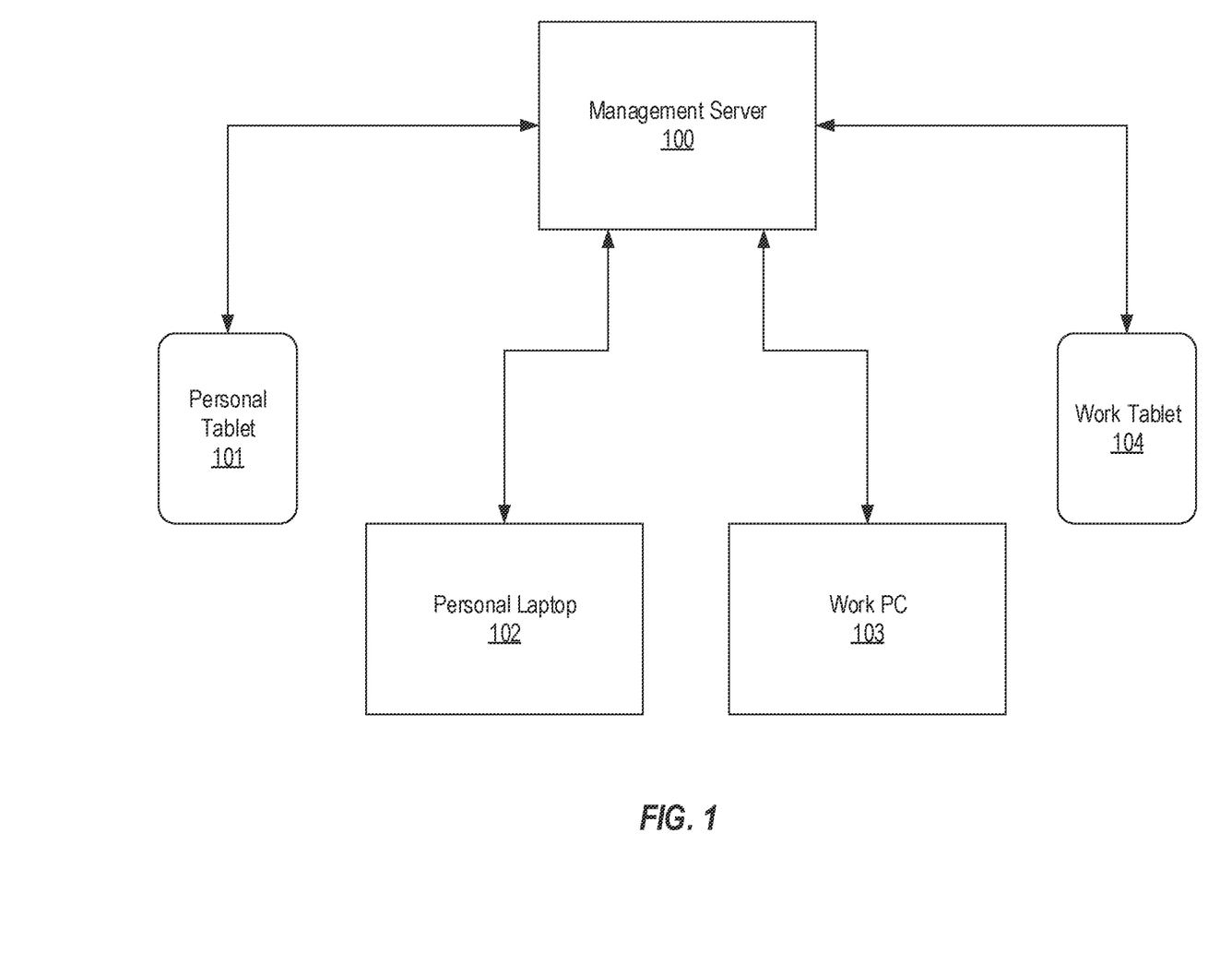
FIG. 1 provides examples of how a user may be enabled to access a set of applications for a variety of computing devices.

FIG. 1 provides an example of how a user may be enabled to use multiple computing devices to access a set of applications. As shown, a business or other entity may maintain a management server 100 which interfaces with any computing device that an employee may be allowed to use to access applications (not shown). As one example only, these computing devices could include a personal tablet 101, a personal laptop 102, a work PC 103 and a work tablet 104. For a public-cloud-based application, any of these computing devices can interface with the public cloud to access the application. For a private-cloud-based/on-premises application, personal tablet 101 and personal laptop 102 may be allowed to access the application using a VDI connection over a VPN or gateway, whereas work PC 103 and work tablet 104, which may be connected to the corporate network, may access the application using a VDI connection. In some cases, work PC 103 and/or work tablet 104 may include native versions of an application. Of primary relevance, management server 100 enables the user to access the applications seamlessly regardless of which computing device he uses.

Although these advances may enable the user to access his applications from virtually any of his computing devices, they create difficulties that degrade the user experience relative to traditional single computing device scenarios. For example, many users prefer putting their laptop to sleep or into hibernation rather than shutting it down to retain the state of the running applications. More particularly, when a computing device is awakened, each application that was running when the computing device was put to sleep will resume running, including maintaining the position of its window on the desktop. This restoring of the state of the running applications is seamless when the user uses the same computing device and when the applications are native because their state is retained in local memory or storage.

In contrast, when the applications are VDI-based or cloud-based, waking the computing device from a sleep or hibernation state does not directly restore any applications that had been running given that the applications are remote to the computing device. Instead, to restore such VDI-based or cloud-based applications, it is necessary for the locally-executing components to reestablish a connection with the source of the applications (e.g., by launching a VDI client or accessing the cloud application in a browser). As a result, restoring a non-locally-hosted application can take a significant amount of time thereby eliminating the primary benefit of putting the computing device into a sleep or hibernation state. The same issue exists when the user moves to a different computing device. In particular, when the user logs in to the different computing device, he will need to wait for the connection to the remotely-hosted application to be established. He will also need to wait for any locally-hosted applications to be loaded.

Additional issues arise when the user desires to resume work on a different computing device. For example, if a user initially accesses applications on a mobile device that has a single display (e.g., a phone or tablet), the windows for the applications may be arranged in a tiered manner. If the user then moves over to a home office computing device that includes two monitors and a Bluetooth keyboard and mouse, the user may manually arrange the windows for the applications on the different monitors. Also, the user may need to wait for drivers for the keyboard and mouse to be virtualized to allow them to be used to access the applications. If the user then travels to his work office to access the same applications on his work computing device that has three monitors and a USB keyboard and mouse, he may again need to manually arrange the windows for each application on the monitors and await enumeration of the keyboard and mouse. In short, resuming work when moving between different computing devices may require loading/reconnecting each application, manually arranging the applications' windows and enumerating/configuring peripherals, all of which adds significant delay and complexity to the process of resuming work. In a worst case scenario, it may take multiple minutes for a user to resume working with applications on a different computing device.

BRIEF SUMMARY

The present invention extends to systems, methods and computer program products for predicting and creating a session on a user's computing device. When a user accesses a set of applications from multiple computing devices and/or at different times or locations, telemetry information can be captured and processed to generate session predictions for the user. The session predictions can then be employed to automatically create sessions on the user's computing devices based on the user's location and the time of day. In this way, the user can immediately resume productivity upon logging in to his computing devices.

In some embodiments, the present invention may be implemented as a method for predicting and creating a session on a user's computing device. A management server may receive telemetry information from at least one computing device that a user uses to access a plurality of applications. It can be determined from the telemetry information that the user uses a first computing device of the at least one computing device to access a first set of applications of the plurality of applications at a first time of day. A first session prediction can be created from the telemetry information. The first session prediction can identify the first computing device, the first set of applications and the first time of day. As the first time of day approaches, the first session prediction can be employed to cause the first set of applications to be launched on the first computing device such that the first set of applications are accessible when the user logs in to the first computing device at the first time of day.

In some embodiments, the present invention may be implemented as computer storage media storing compute executable instructions which when executed implement a method for predicting and creating a session on a user's computing device. It can be determined that a user uses a first computing device to access a first set of applications of a plurality of applications at a first time of day. A first session prediction can be created. The first session prediction can identify the first computing device, the first set of applications and the first time of day. As the first time of day approaches, the first set of applications can be launched on the first computing device while the first computing device remains locked.

In some embodiments, the present invention may be implemented as a system that includes a management server and a first computing device. The first computing device can have an agent that generates and sends telemetry information to the management server. The telemetry information defines applications that the user uses on the first computing device. The management server generates at least one session prediction from the telemetry information. Each session prediction identifies which of the applications the user uses at a particular time. The agent employs the at least one session prediction to automatically launch the respective applications at the respective particular time.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "computing device" should be construed as any computing device that a user may employ to access a set of applications. In a common but non-limiting example, the set of applications may be those that the user uses as part of his or her employment. Examples of computing devices include a desktop, laptop, thin client, tablet, phone, etc. In a common but non-limiting example, an employee may use one or more computing devices provided by his or her employer and one or more personal computing devices to access a set of applications for work purposes.

Figure 2:
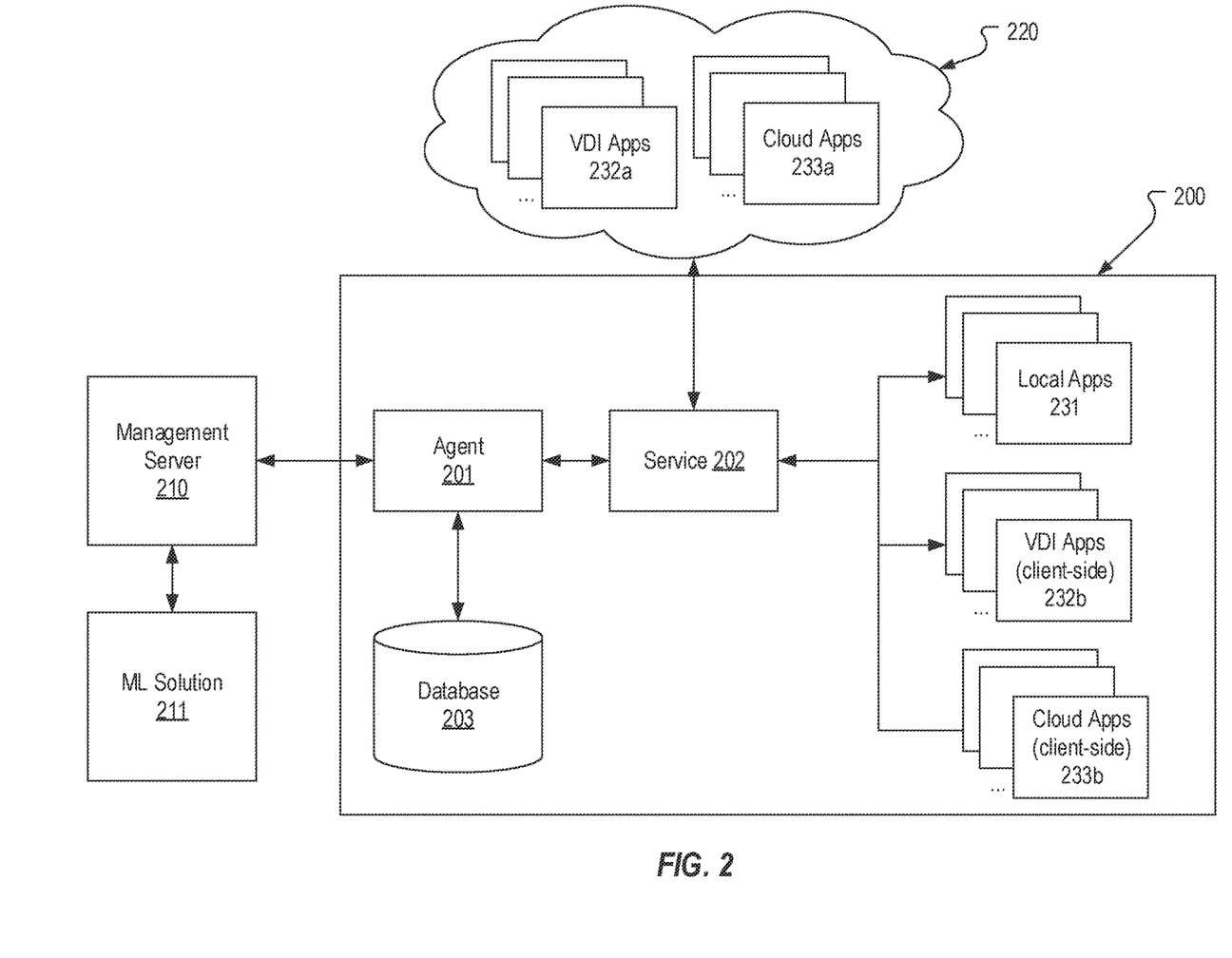
FIG. 2 provides an example of various components that may be employed to implement embodiments of the present invention.

FIG. 2 provides an example of various components that may be employed to implement embodiments of the present invention. A computing device 200 may include an agent 201, a service 202 and a database 203. Agent 201 can interface with a management server 210 that may include or interface with a machine learning (ML) solution 211. Service 202 may manage access to a set of applications (collectively "applications 230") that may include local applications 231 that are natively installed on computing device 200 and VDI applications 232a and cloud applications 233a that are hosted remotely (collectively represented as being hosted in cloud 220). Computing device 200 may include corresponding client-side VDI applications 232b and client-side cloud applications 233b which can represent any client-side components that are installed or deployed on computing device 200 to allow the user to connect to and access VDI applications 232a and cloud applications 233a. For example, VDI applications 232b could include a VDI client and cloud applications 233b could include a browser. A user may employ multiple computing devices 200 to access applications 230.

As an overview, agent 201 and service 202 can interoperate to collect and send "telemetry information" to management server 210 as the user uses a variety of computing devices 200 to access a set of applications. This telemetry information can define a "session" that exists on the user's computing device 200 at a particular time. For example, the telemetry information can include information about computing device 200 (e.g., a unique identifier of computing device 200 and its current location), information about peripherals connected to or integrated with computing device 200 (e.g., the presence and type of a keyboard, mouse, etc., which monitors are connected, their sequence, orientation, etc., whether computing device 200 is connected to a dock or hub, etc.), login information (e.g., when the user logged in, when the user last logged out, when computing device 200 was last put to sleep or into hibernation, etc.) and application information (e.g., which applications are being used, whether the applications are local, VDI or cloud-based, the relative placement of the applications' windows on the display/monitors, etc.). Management server 210 can consolidate this telemetry information that it receives from the user's various computing devices 200 and leverage ML solution 211 to generate session predictions. Management server 210 and agent 201 can then employ these session predictions to automatically restore/create a user's session on one of the user's computing devices 200 to thereby reduce the time it takes for the user to become productive once logging in on the computing device 200.

Figure 3A:
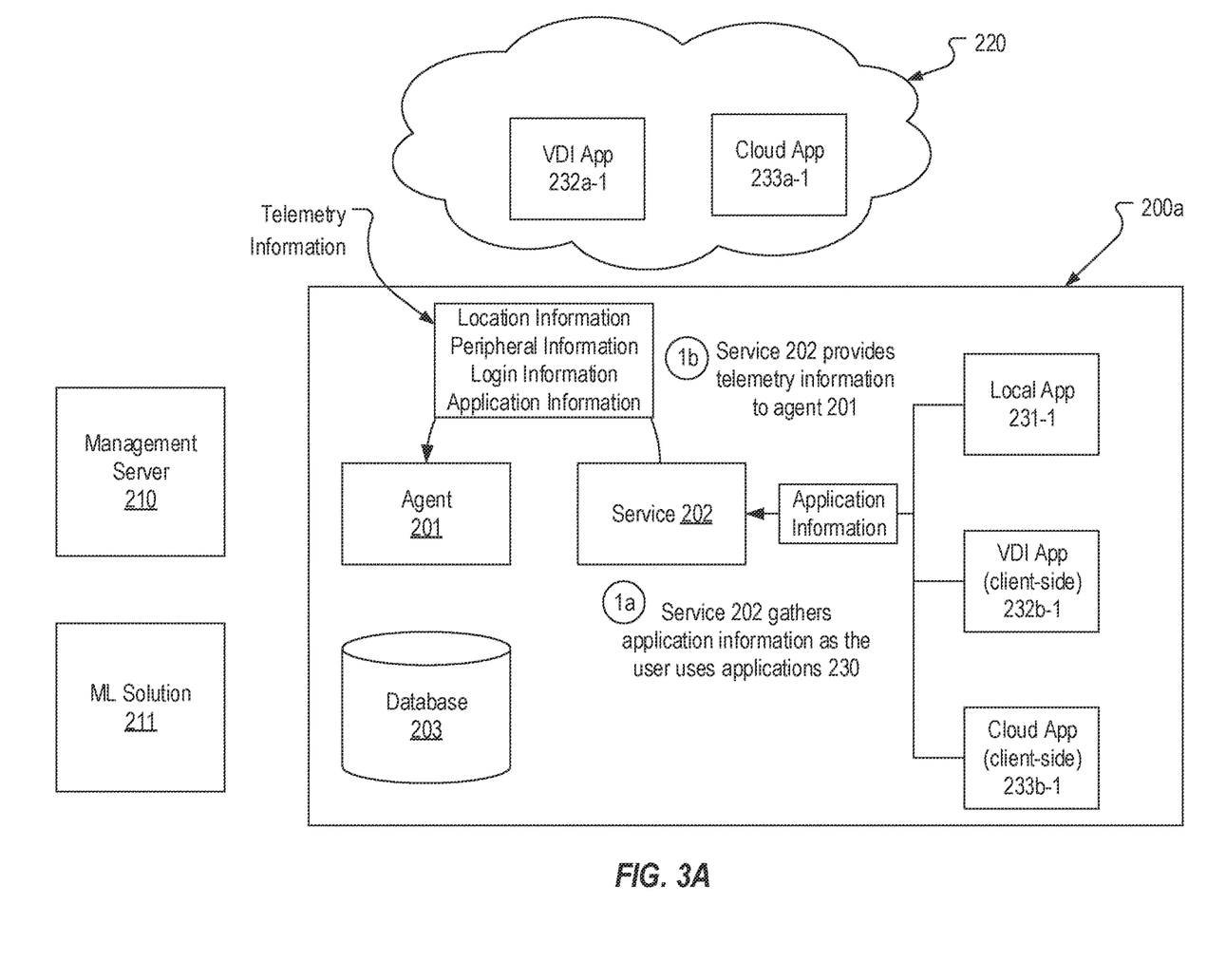
FIGS. 3A-3E provide an example of how session predictions can be created.

FIGS. 3A-3E provide an example of how session predictions for a user can be generated from telemetry information representing the user's use of multiple computing devices 200a and 200b. In FIG. 3A, it is assumed that the user is using computing device 200a to access local application 231-1, VDI application 232a-1 (via VDI app 232b-1) and cloud app 233a-1 (via cloud app 233b-1). As the user uses these applications, in step 1a, service 202 can gather application information. As mentioned above, this application information can include an identification of the applications that the user is currently using, whether the applications are local, VDI, cloud, etc., the placement of the applications' windows on whatever displays computing device 200a may have, etc. Step 1a could be performed on a periodic basis, in response to some event (e.g., upon logging in, prior to computing device 200a going to sleep or the user logging out, in response to the user's location changing, etc.) or at any other suitable time.

In conjunction with step 1a, service 202 can provide the telemetry information to agent 201. This telemetry information can include the application information that service 202 has collected along with location information, peripheral information, login information, etc. Although FIG. 3A assumes that service 202 collects and provides this telemetry information to agent 201, in some embodiments, agent 201 could collect at least some of the telemetry information directly. Accordingly, agent 201 and service 202 can be viewed as interoperating components (e.g., kernel-mode and user-mode counterparts) and embodiments of the present invention should not be limited by which component may perform a particular task described herein.

Figure 3B:
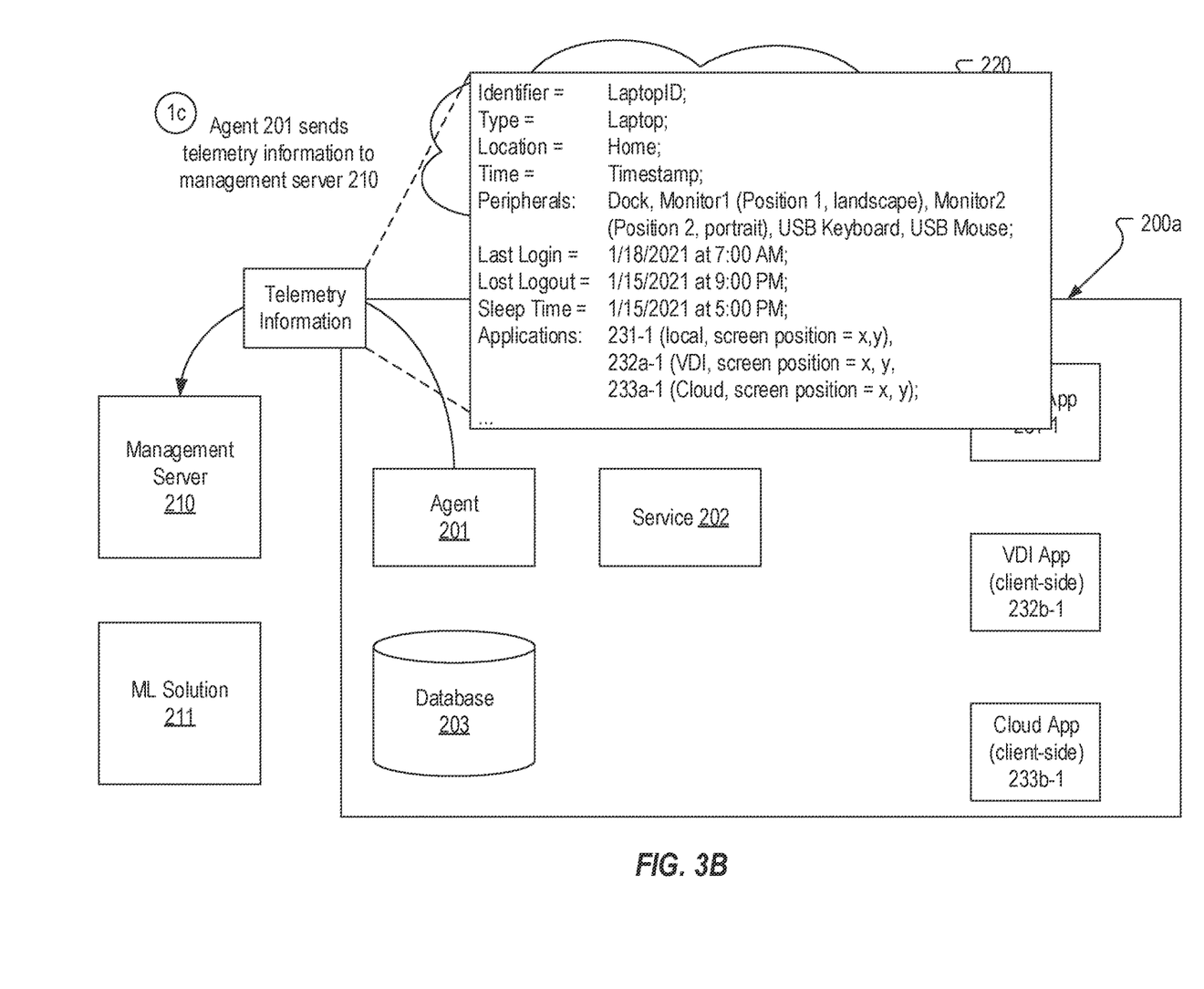

Turning to FIG. 3B, in step 1c, agent 201 can send the telemetry information to management server 210. As with step 1a, step 1c can be performed on a periodic basis, in response to some event (including in response to receiving updated application information) or at any other suitable time. FIG. 3B also provides a generalized example of what the telemetry information may define. As shown, the telemetry information can include a unique identifier of the computing device to which it pertains (which in this example is computing device 200a that is assumed to have an identifier of "LaptopID"), an identification of the type of the computing device (e.g., laptop), a location of the computing device (which is assumed to be the user's home), a time that the telemetry information represents (i.e., the time when the represented session existed), peripheral information (which can include an identification of the relative position and orientation of each display), login information (e.g., that the user last logged in at 7:00 AM on Jan. 18, 2021, last logged out at 9:00 PM on Jan. 15, 2021 and last put computing device 200a to sleep at 5:00 PM on Jan. 15, 2021) and application information (which can include an identification of each running application and the position of its screen/window). As an example only, FIGS. 3A and 3B could represent how embodiments of the present invention could function in a scenario where the user has logged in to his work or personal laptop at home and started working with local application 231-1, VDI application 232a-1 and cloud application 233a-1.

Figure 3C:
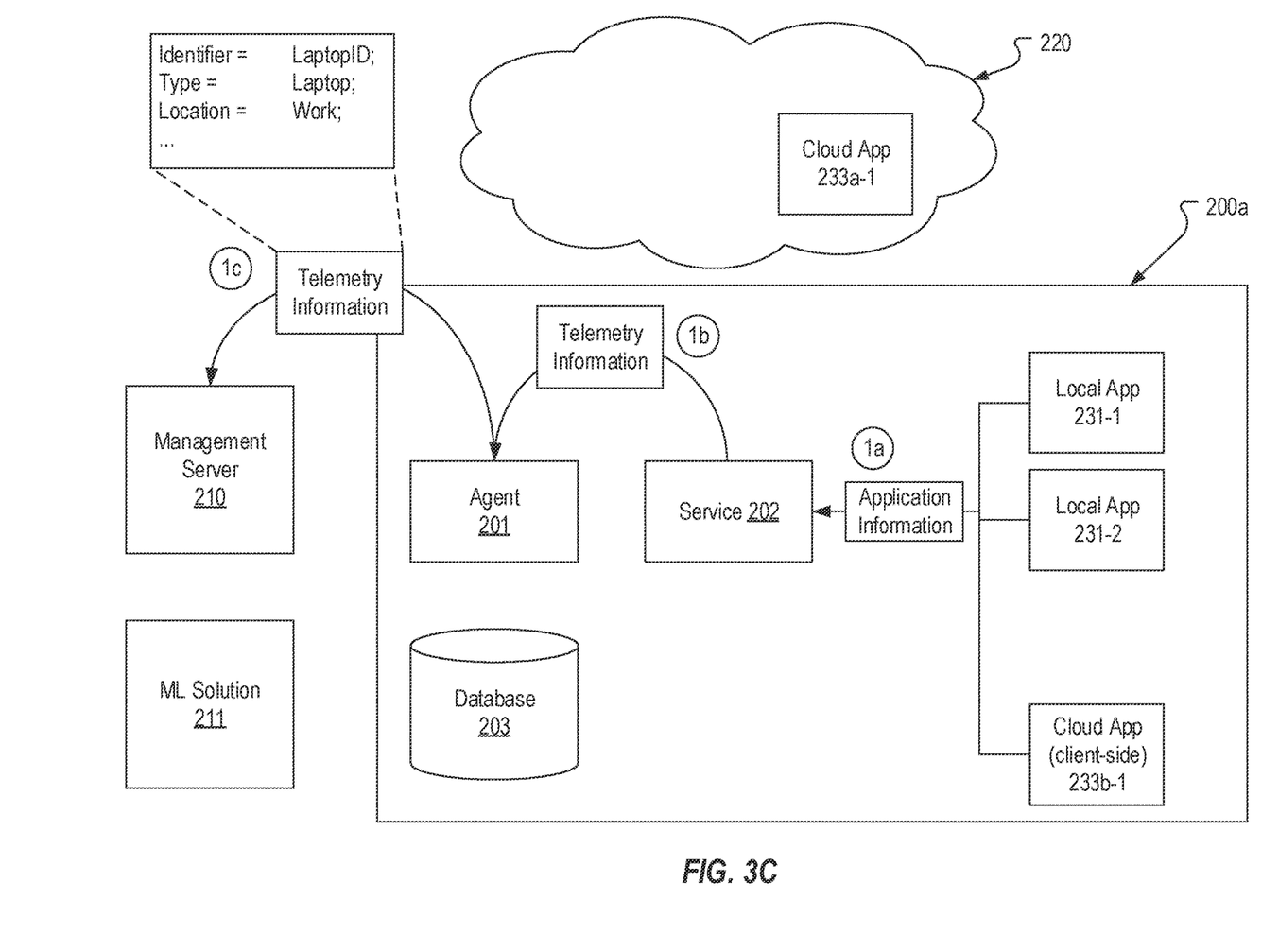

FIG. 3C is intended to represent how steps 1a-1c could be repeated by agent 201 and service 202 on the same computing device 200a at a different time. In particular, whereas FIGS. 3A and 3B could represent the scenario where the user has logged in at home, FIG. 3C can represent the scenario where the user has logged back in after arriving at work. For this example, it is now assumed that the user is using local applications 231-1 and 232-2 and cloud application 233a-1 which could be reflected in the telemetry information provided to management server 210. Although not shown, with respect to what is shown in FIG. 3B, the telemetry information sent in FIG. 3C may identify different login information (e.g., identifying the user's login upon arriving at work and the logout/sleep the user performed before/while commuting) and different peripheral information (e.g., identifying whatever hardware arrangement the user employs for his laptop at work).

Figure 3D:
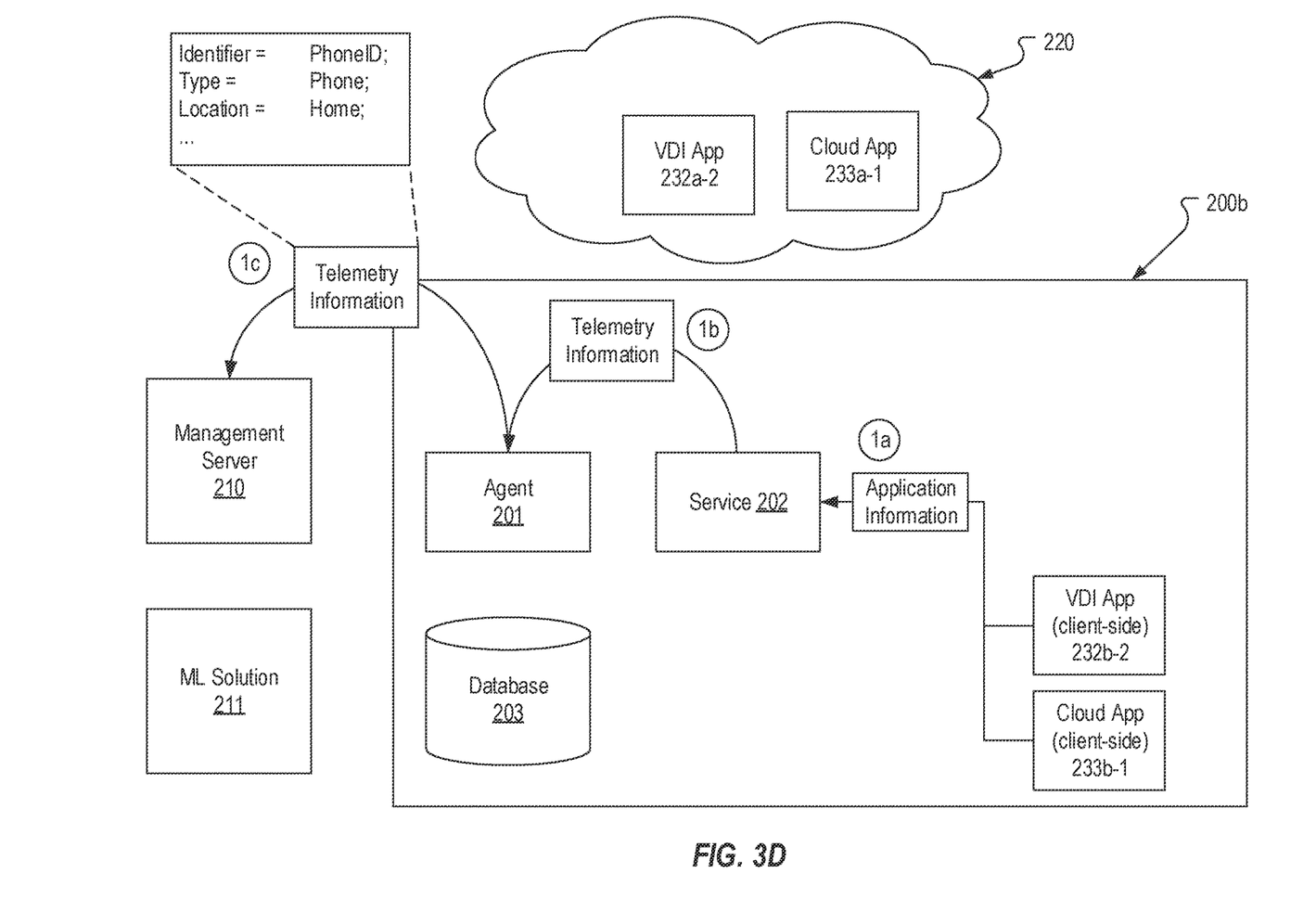

FIG. 3D is intended to represent how steps 1a-1c could be performed by an instance of agent 201 and service 202 on a different computing device 200b that the user employs. For example, computing device 200b could be a phone that the user uses for work purposes. For this example, it is assumed that the user is using VDI applications 232a-2 and cloud application 233a-1 on computing device 200b. The telemetry information created and sent to management server 210 could reflect this usage of the applications as well as the appropriate login information, peripheral information, etc.

Figure 3E:
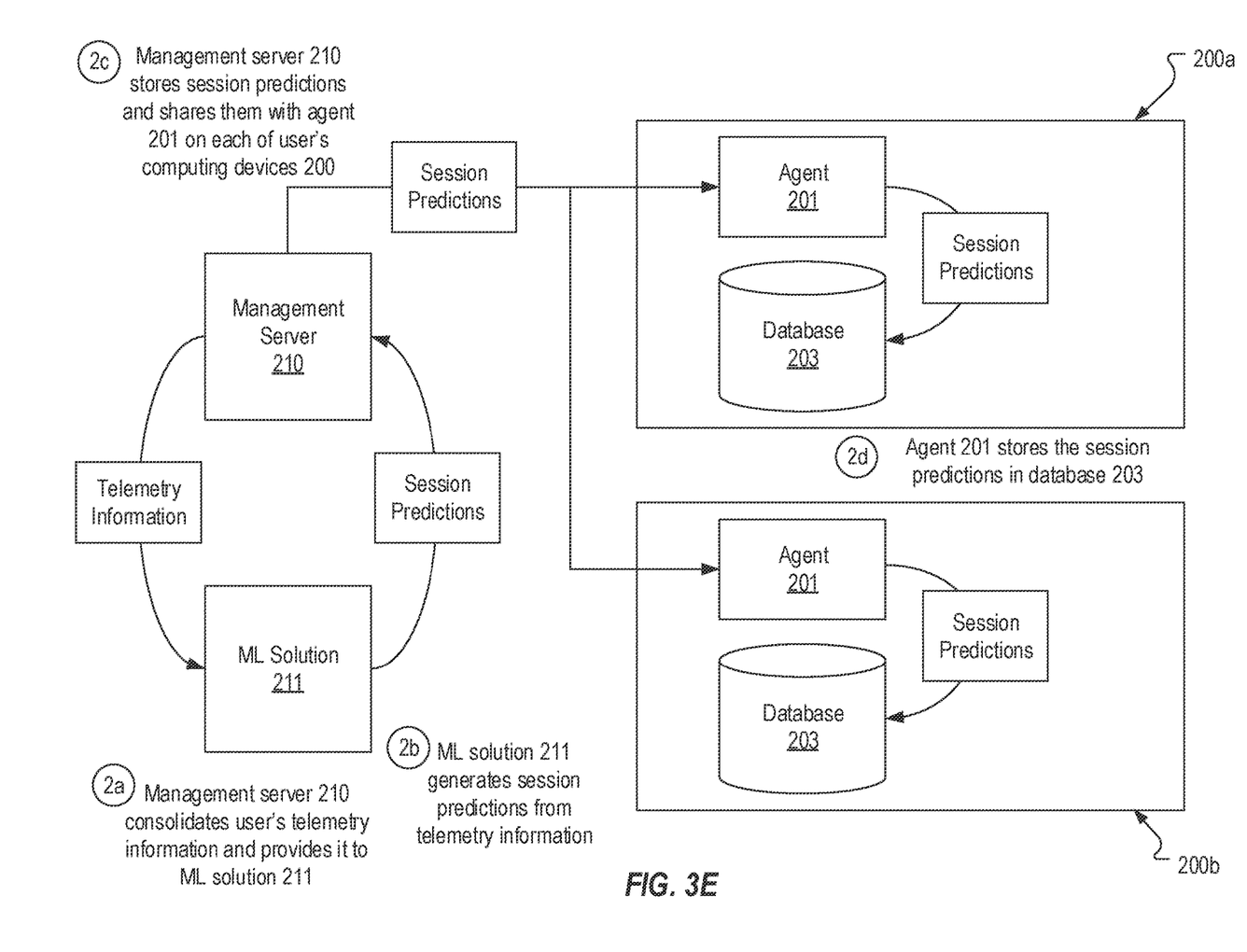

Accordingly, FIGS. 3A-3D are intended to represent that telemetry information may be generated and sent from a variety of computing devices 200 that the user may use to access a set of applications. In other words, agent 201 and service 202 can be deployed on each of the user's computing devices 200 to capture and report the user's "sessions" to management server 210. Turning to FIG. 3E, in step 2a, management server 210 can consolidate the telemetry information it receives from each instance of agent 201 on any of the user's computing devices 200. In other words, management server 210 can consolidate the telemetry information representing the user's sessions that may span a variety of computing devices. Management server 210 can then provide the telemetry information it consolidated for the user to ML solution 211. Management server 210 could be configured to provide the telemetry information to ML solution 211 at any suitable time or interval (e.g., in response to receiving new telemetry information, periodically, on demand, etc.).

In step 2b, ML solution 211 can employ machine learning techniques to generate session predictions from the telemetry information. Step 2b could also be performed at any suitable time or interval (e.g., in response to receiving updated telemetry information from management server 210, periodically, on demand, etc.). ML solution 211 can then provide the session predictions for the user to management server 210. In step 2c, management server 210 can provide the session predictions to the instance of agent 201 on any of the user's computing devices 200 (e.g., computing devices 200a and 200b). Step 2c could be performed at any suitable time or interval. For example, agent 201 could be configured to periodically check in with management server 210 (e.g., during startup on computing device 200). In such cases, management server 210 could provide any updated session predictions to agent 201 in response to a check in. In other embodiments, management server 210 could push session predictions to agent 201 whenever the session predictions are updated.

Regardless of when management server 210 provides session predictions to agent 201, in step 2d, agent 201 can store the session predictions in database 203. As a result, the session predictions for the user can be stored (or at least accessible) locally on each computing device 200 that the user may use during a session. As one example only, the session predictions can be stored on the user's laptop, work desktop, any mobile device the user uses for work purposes, etc.

Figure 4:
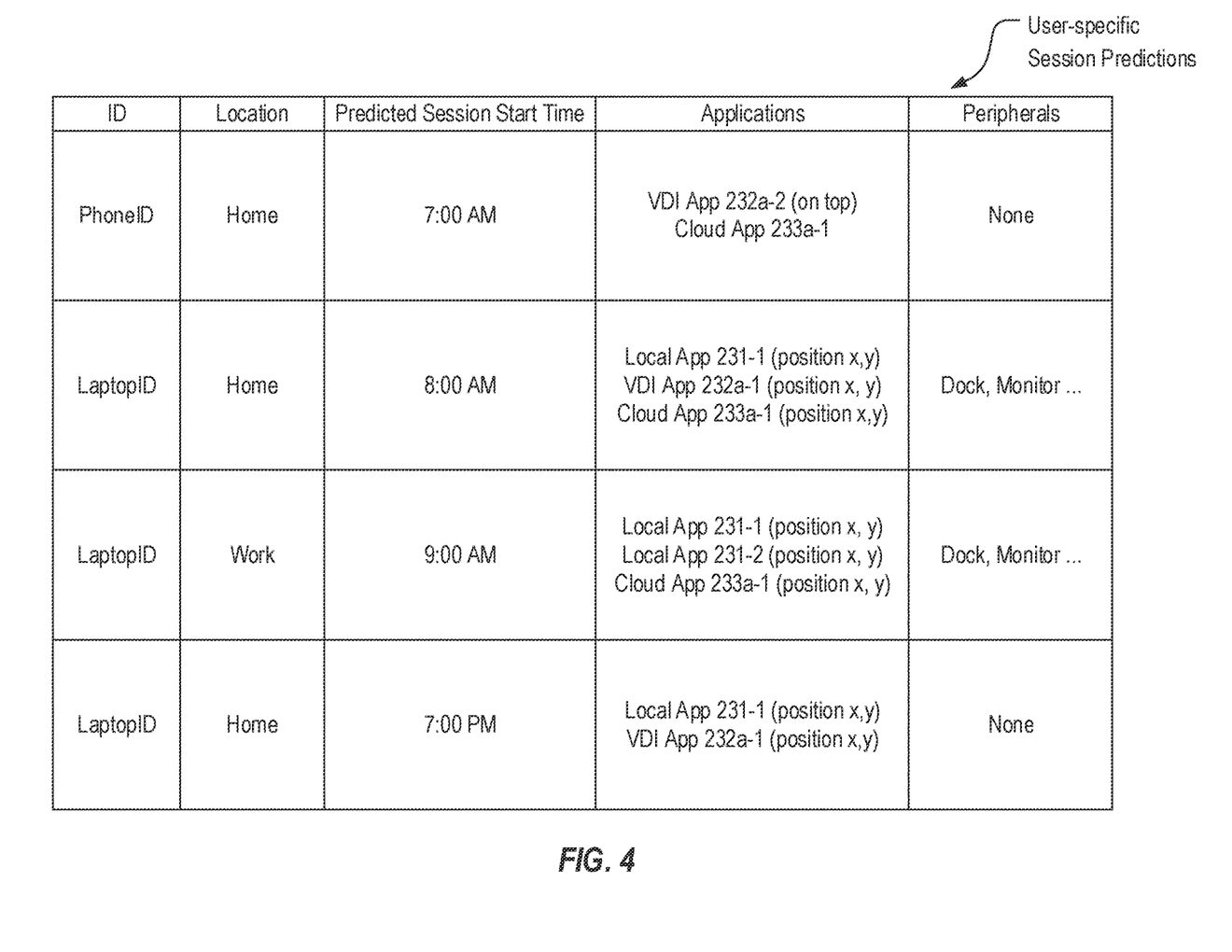
FIG. 4 provides an example of session predictions for a particular user.

FIG. 4 provides a generalized example of how ML solution 211 may structure session predictions in some embodiments of the present invention. As indicated, the session predictions can be user specific. Additionally, the session predictions can associate a predicted session start time, predicted applications (including the predicted arrangement of their screens) and predicted peripheral configurations/preferences for the user's computing devices 200 and location. For example, in FIG. 4, it is assumed that ML solution 211 has learned from the consolidated telemetry information for the particular user that the user typically uses his phone at home starting at 7:00 AM and without any peripherals attached to access VDI application 232a-2 and cloud application 233a-1 with VDI application 232a-2's window being active. Likewise, it is assumed that ML solution 211 has learned that the user typically uses his laptop docked at home starting at 8:00 AM to access local application 231-1, VDI application 232a-1 and cloud application 233a-1. This session prediction can also identify the typical position of the applications' screens and the typical configurations/preferences for the connected peripherals. It is further assumed that ML solution 211 has learned that the user typically uses his laptop docked at work with various peripherals attached starting at 9:00 AM to access local applications 231-1 and 231-2 and cloud application 233a-1. Finally, it is assumed that ML solution 211 has learned that the user typically uses his laptop at home starting at 7:00 PM to access local application 231-1 and VDI application 232a-1 without any peripherals attached. As management server 210 relays additional telemetry information, ML solution 211 could update these session predictions to most accurately predict when, how and where the user will access a particular set of applications.

In some embodiments, management server 210 can relay to agent 201 only the session predictions that are specific to the respective computing device 200. For example, the top session prediction in FIG. 4 could be relayed in step 2d to the instance of agent 201 executing on computing device 200b while the other three session predictions in FIG. 4 could be relayed to the instance of agent 201 executing on computing device 200a. In any case, the session predictions, including the predicted time, applications and peripherals, can be stored in database 203 (or otherwise accessible to agent 201) on the computing device 200 to which they pertain.

Figure 5A:
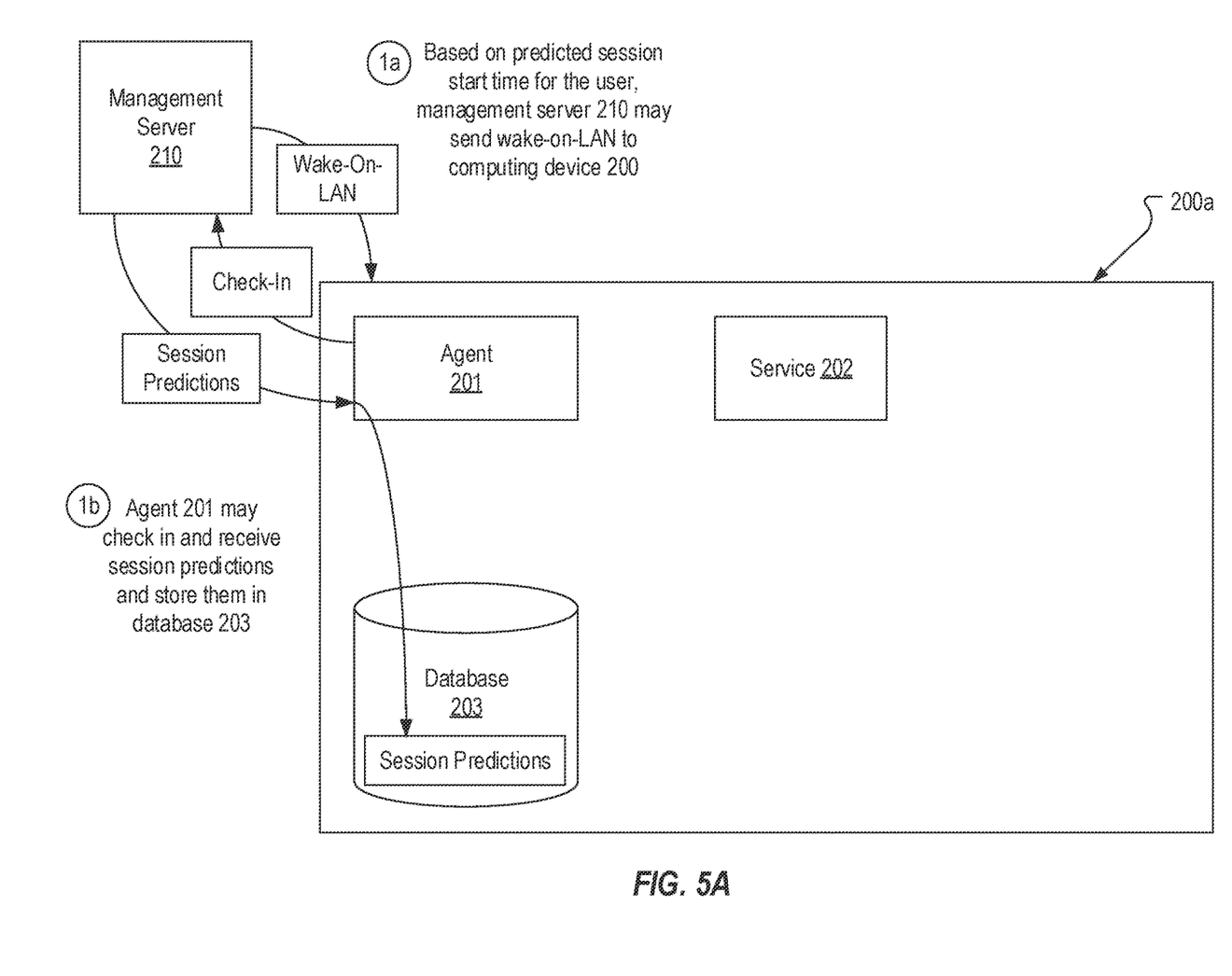
FIGS. 5A-5C provide an example of how a predicted session can be automatically created on one of a user's computing devices.
Figure 5B:
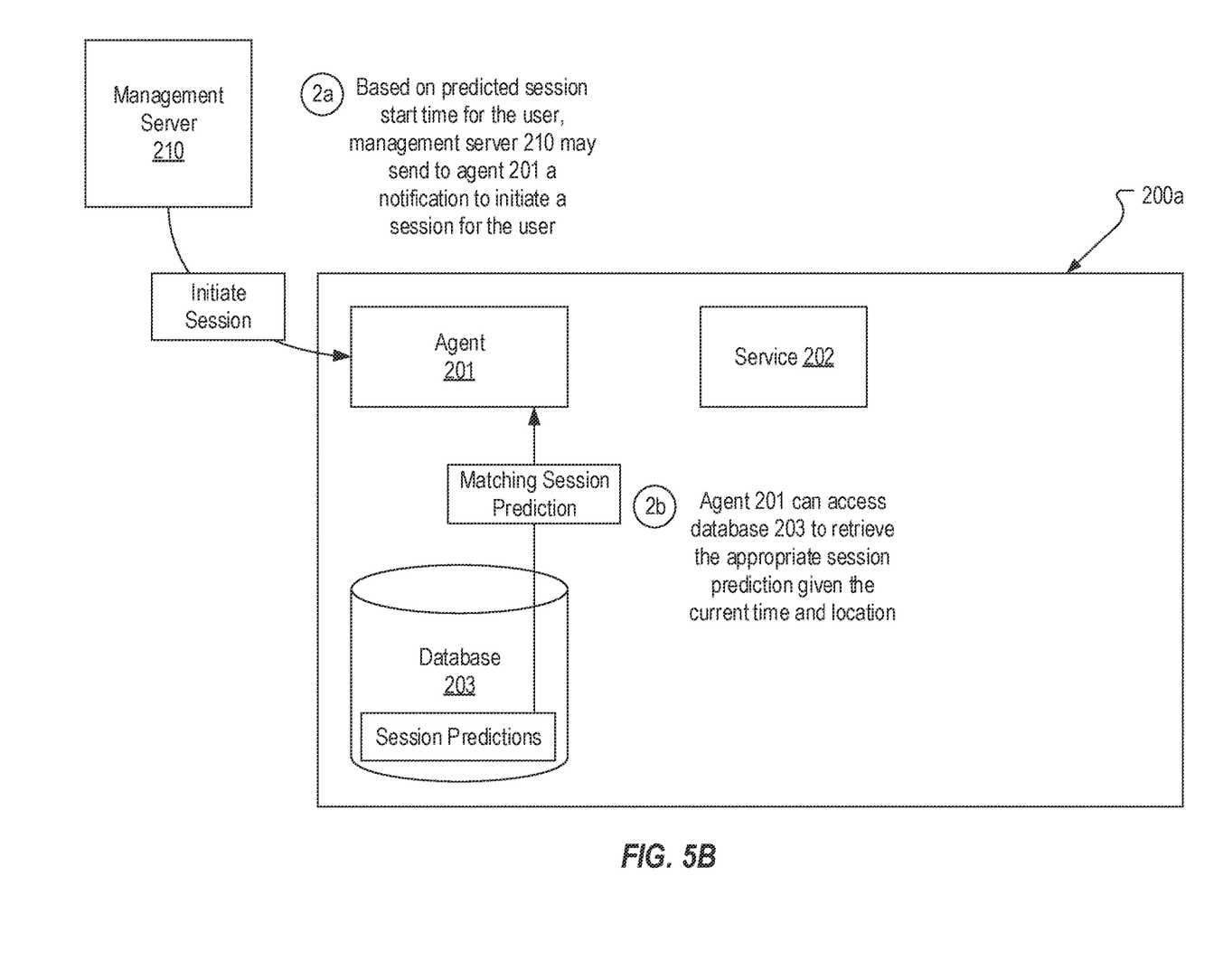
Figure 5C:
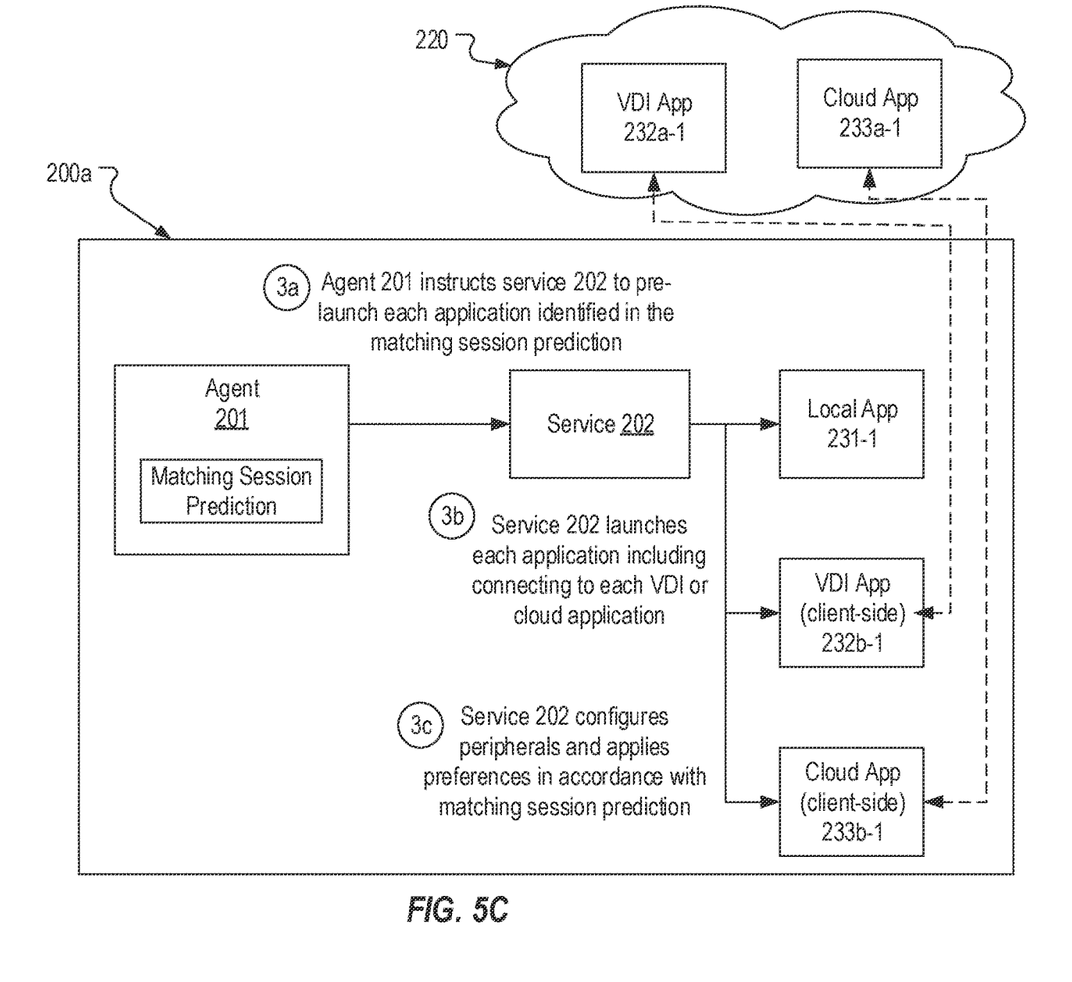

FIGS. 5A-5C provide an example of how the user's session predictions can be employed to automatically create/restore a session on a particular computing device 200 at a particular time. FIG. 5A represents optional initial steps that may be performed in some cases. In step 1a, management server 210 may employ the session predictions it maintains to determine that the user is likely to start using computing device 200a soon (e.g., within 10 minutes) and, if necessary, may send a wake-on-LAN to computing device 200a to ensure that agent 201 can prepare the session in accordance with the session predictions. In step 1b, which agent 201 may optionally perform after computing device 200a awakens or, if already awake, at some point before attempting to prepare the session, agent 201 may check in with management server 210 to retrieve any updated session predictions for computing device 200a (i.e., the computing device 200 on which the instance of agent 201 is executing).

Turning to FIG. 5B, in step 2a, and again based on the predicted session start time for the user, management server 210 may send to agent 201 a notification to initiate a session for the user on computing device 200a. For example, with reference to FIG. 4, just before 8:00 AM, management server 210 could determine that the user is likely to start using his laptop and could therefore notify the instance of agent 201 on the user's laptop to initiate a session. In response to the notification, in step 2b, agent 201 can access the session predictions in database 203 to retrieve the appropriate session prediction. For example, agent 201 could use the current time (e.g., just before 8:00 AM) and location (home) to retrieve the session prediction matching the current time and location.

In some embodiments, in step 2a, management server 210 could directly provide the predicted session to agent 201 rather than instructing agent 201 to retrieve the predicted session from database 203. Also, in some embodiments, management server 210 may not perform step 2a. To the contrary, agent 201 may directly determine that the user is likely to start using computing device 200a and in response may retrieve the appropriate session prediction. In other words, there are many different ways in which management server 210 and agent 201 could accomplish the functionality described herein, and the present invention should not be limited to the specifically-described examples.

Turning to FIG. 5C, in step 3a, agent 201 can instruct service 202 to pre-launch each application identified in the matching session prediction. Using the example of FIG. 4 and assuming it is approaching 8:00 AM, agent 201 could instruct service 202 to launch local application 231-1 and to establish a connection with VDI application 232a-1 and cloud application 233a-1 (e.g., using a user login token). In step 3c, service 202 can also configure peripherals and apply preferences in accordance with the matching session prediction. For example, service 202 could enumerate the identified peripherals, configure the display(s), arrange the applications' windows in the specified positions across the display(s), etc. In essence, agent 201 and service 202 can cause each application to be immediately accessible on computing device 200a as if the applications were all local applications and computing device were resuming from a sleep state. Notably, all of this functionality can be performed while computing device 200a remains in a locked state. Therefore, the user will still need to log in before accessing the applications. However, once the user logs in, he will be able to immediately resume productivity without needing to manually load or connect to any applications, without needing to make any peripheral configurations and without needing to manually arrange any windows. For example, in some embodiments, the user may be able to resume productivity in less than two seconds even though he may use a combination of local, VDI and cloud applications across a variety of computing devices and/or in a variety of locations with different peripheral arrangements.

Similar functionality can be performed by instances of agent 201 and service 202 on any of the computing devices 200 that the user may use to access the set of applications (or any computing device that management server 210 manages). Continuing with the example of FIG. 4, as 9:00 AM approaches, the steps of FIGS. 5A-5C may be repeated to cause the predicted session to be created on the user's laptop so that the user can immediately resume productivity upon arriving at work. Similarly, as 7:00 PM approaches, the steps of FIGS. 5A-5C may be repeated to cause the predicted session to be created on the user's laptop so that the user can immediately resume productivity at home. Likewise, as 7:00 AM approaches on the next morning, the steps of FIGS. 5A-5C may be repeated to cause the predicted session to be created on the user's phone.

Figure 6:
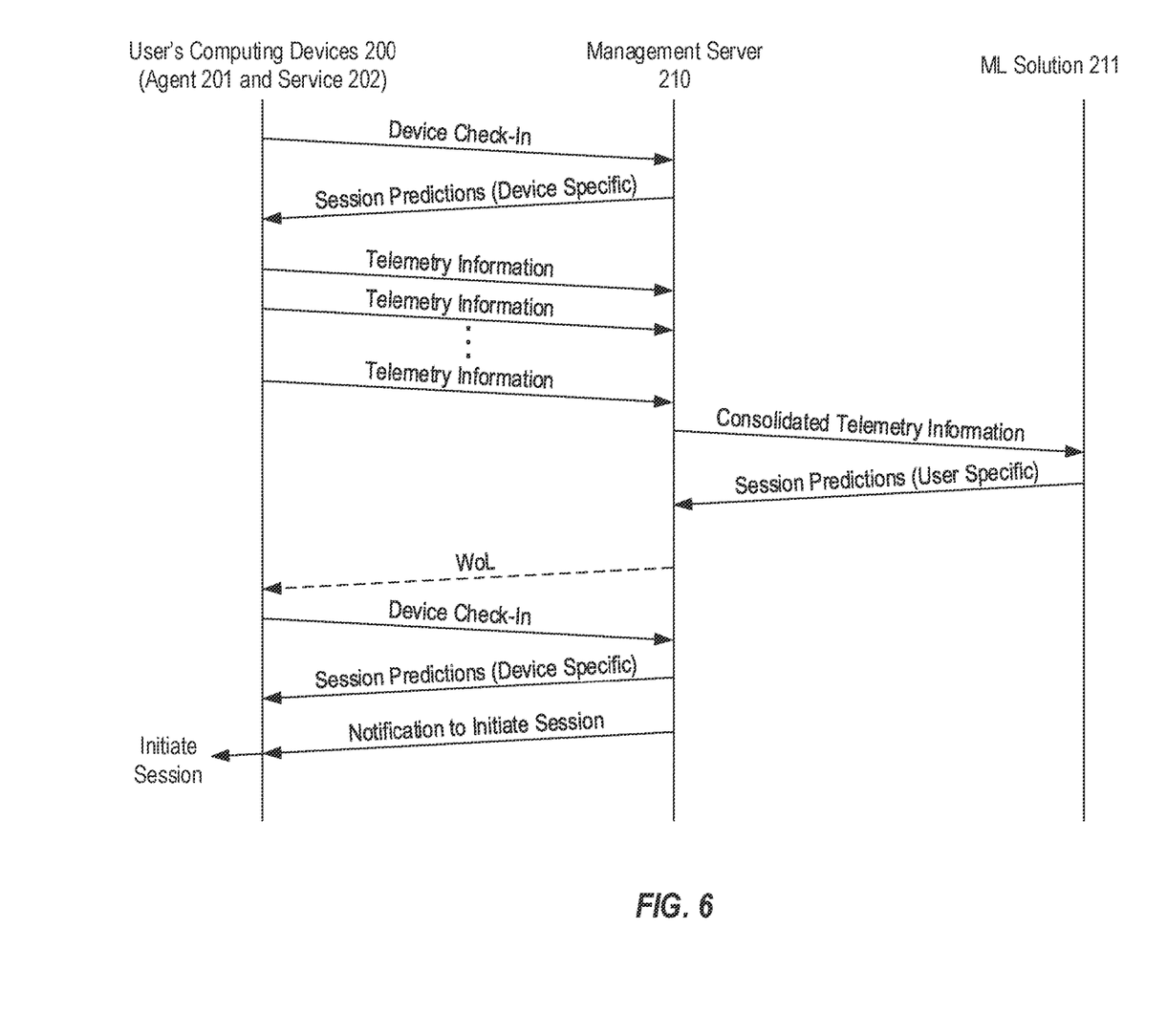
FIG. 6 provides a flow diagram representing how sessions can be predicted and created on a user's computing devices.

FIG. 6 provides a flow diagram representing how the above-described functionality can be implemented in some embodiments. As shown, each of the user's computing devices 200 can periodically check in with management server 210. In response, management server 210 may send the user's session predictions that may be device specific. As the user uses his computing devices 200, they may report telemetry information to management server 210. Management server 210 can consolidate the telemetry information and periodically provide it to ML solution 211. ML solution 211 can generate and send user-specific session predictions to management server 210. In some embodiments, management server 210 may determine that one of the user's computing devices 200 should be awakened and can send a wake-on-LAN command. In response, computing device 200 can check in and receive back any updated session predictions. Management server 210 may also send a notification to instruct the computing device 200 to initiate a session in accordance with the applicable session prediction.

Computing device 200 may then initiate the session to enable the user to immediately resume productivity upon logging in.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for predicting and creating a session on a user's computing device, the method comprising:
receiving, at a management server, telemetry information from at least one computing device that a user uses to access a plurality of applications;
determining, from the telemetry information, that the user uses a first computing device of the at least one computing device to access a first set of applications of the plurality of applications at a first time of day;
creating a first session prediction that identifies the first computing device, the first set of applications and the first time of day;
as the first time of day approaches, employing the first session prediction to cause the first set of applications to be launched on the first computing device such that the first set of applications are accessible when the user logs in to the first computing device at the first time of day.

2. The method of claim 1, wherein the management server receives telemetry information from a plurality of computing devices that the user uses to access the plurality of applications.

3. The method of claim 1, wherein the first set of applications includes at least one virtual desktop infrastructure (VDI) application or at least one cloud-based application.

4. The method of claim 3, wherein causing the first set of applications to be launched on the first computing device comprises creating a connection with the at least one VDI application or the at least one cloud-based application.

5. The method of claim 1, wherein the first session prediction also identifies a location.

6. The method of claim 1, further comprising:
determining, from the telemetry information, that a first set of peripherals are connected to the first computing device when the user accesses the first set of applications, and wherein the first session prediction identifies the first set of peripherals; and
wherein employing the first session prediction comprises configuring the first computing device to employ the first set of peripherals.

7. The method of claim 1, wherein determining that the user uses the first computing device to access the first set of applications comprises determining positions of windows of the first set of applications, and wherein the first session prediction identifies the positions; and
wherein employing the first session prediction comprises causing the windows of the first set of applications to be positioned in the positions identified in the first session prediction.

8. The method of claim 1, wherein the at least one computing device comprises a plurality of computing devices, the method further comprising:
determining, from the telemetry information, that the user uses a second computing device of the plurality of computing devices to access a second set of applications of the plurality of applications at a second time of day;
creating a second session prediction that identifies the second computing device, the second set of applications and the second time of day; and
as the second time of day approaches, employing the second session prediction to cause the second set of applications to be launched on the second computing device such that the second set of applications are accessible when the user logs in to the second computing device at the second time of day.

9. The method of claim 1, further comprising:
determining, from the telemetry information, that the user uses the first computing device to access a second set of applications of the plurality of applications at a second time of day;

creating a second session prediction that identifies the first computing device, the second set of applications and the second time of day; and as the second time of day approaches, employing the second session prediction to cause the second set of applications to be launched on the first computing device such that the second set of applications are accessible when the user logs in to the first computing device at the second time of day.

10. The method of claim 9, wherein the first and second session predictions identify different locations.

11. The method of claim 1, further comprising:
receiving additional telemetry information from the first computing device; and
updating the first session prediction based on the additional telemetry information.

12. One or more computer storage media storing compute executable instructions which when executed implement a method for predicting and creating a session on a user's computing device, the method comprising:
determining that a user uses a first computing device to access a first set of applications of a plurality of applications at a first time of day;
creating a first session prediction that identifies the first computing device, the first set of applications and the first time of day; and
as the first time of day approaches, causing the first set of applications to be launched on the first computing device while the first computing device remains locked.

13. The computer storage media of claim 12, wherein the method further comprises:
determining that the user uses the first computing device to access a second set of applications of the plurality of applications at a second time of day;
creating a second session prediction that identifies the first computing device, the second set of applications and the second time of day; and
as the second time of day approaches, causing the second set of applications to be launched on the first computing device while the first computing device remains locked.

14. The computer storage media of claim 12, wherein the method further comprises:
determining that the user uses a second computing device to access a second set of applications of the plurality of applications at a second time of day;
creating a second session prediction that identifies the second computing device, the second set of applications and the second time of day; and
as the second time of day approaches, causing the second set of applications to be launched on the second computing device while the second computing device remains locked.

15. The computer storage media of claim 12, wherein the first set of applications includes at least one VDI application or at least one cloud-based application.

16. The computer storage media of claim 12, wherein the first set of applications includes at least one VDI application and at least one cloud-based application.

17. The computer storage media of claim 16, wherein the first set of applications also includes at least one local application.

18. A system comprising:
a management server; and
a first computing device having an agent that generates and sends telemetry information to the management server, the telemetry information defining applications that the user uses on the first computing device;
wherein the management server generates at least one session prediction from the telemetry information, each session prediction identifying which of the applications the user uses at a particular time; and
wherein the agent employs the at least one session prediction to automatically launch the respective applications at the respective particular time.

19. The system of claim 18, wherein launching the respective applications at the respective particular time comprises creating a connection to at least one VDI application or at least one cloud-based application.

20. The system of claim 18, further comprising:
a second computing device having an agent that generates and sends second telemetry information to the management server, the second telemetry information defining applications that the user uses on the second computing device;
wherein the management server generates at least one session prediction from the second telemetry information, each session prediction generated from the second telemetry information identifying which of the applications the user uses at a particular time; and
wherein the agent on the second computing device employs the at least one session prediction generated from the second telemetry information to automatically launch the respective applications on the second computing device at the respective particular time.

* * * * *